(12) United States Patent
Li et al.

(10) Patent No.: US 10,958,098 B1
(45) Date of Patent: Mar. 23, 2021

(54) UPS SYSTEM FOR POWERING ALTERNATING AND DIRECT CURRENT LOADS

(71) Applicant: Google LLC, Mountain View, CA (US)

(72) Inventors: Xiong Li, Santa Clara, CA (US); Xin Li, San Jose, CA (US); Philippe H. Gow, Sunnyvale, CA (US); Qiong Wang, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/594,704

(22) Filed: Oct. 7, 2019

(51) Int. Cl.
| | |
|---|---|
| H02J 9/06 | (2006.01) |
| H02M 3/335 | (2006.01) |
| H02J 3/38 | (2006.01) |
| H02J 7/00 | (2006.01) |
| H02J 1/10 | (2006.01) |
| H02J 3/00 | (2006.01) |

(52) U.S. Cl.
CPC .............. *H02J 9/062* (2013.01); *H02J 1/102* (2013.01); *H02J 3/38* (2013.01); *H02J 7/0024* (2013.01); *H02M 3/33584* (2013.01); *H02J 3/001* (2020.01)

(58) Field of Classification Search
CPC ...................................................... H02J 9/062
USPC ............................................................ 307/66
See application file for complete search history.

(56) References Cited

U.S. PATENT DOCUMENTS

| | | | |
|---|---|---|---|
| 5,241,217 A | 8/1993 | Severinsky | |
| 5,465,011 A | 11/1995 | Miller et al. | |
| 5,939,799 A | 8/1999 | Weinstein | |
| 5,978,236 A | 11/1999 | Faberman et al. | |
| 6,134,124 A | 10/2000 | Jungreis et al. | |

(Continued)

FOREIGN PATENT DOCUMENTS

| | | |
|---|---|---|
| CN | 201181856 | 1/2009 |
| CN | 102394510 | 3/2012 |

(Continued)

OTHER PUBLICATIONS fiberopticlink.com [online], "Integrated 75W AC/DC UPS with Battery Backup, Regulated Power With UPS for Industrial Equipment," published on or before Oct. 4, 2019, [retrieved on Oct. 4, 2019], retrieved from: URL<https://www.fiberopticlink.com/product/integrated-75w-ac-dc-ups-with-battery-backup/?gclid=EAIaIQobChMIkdiIm_615AIVhpOzCh2-aA02EAQYASABEgJgO_D_BwE>, 7 pages.

(Continued)

*Primary Examiner* — Joseph Chang
(74) *Attorney, Agent, or Firm* — Fish & Richardson P.C.

(57) ABSTRACT

Methods, systems, and apparatus, for powering AC and DC loads in the event of a power failure. In one aspect, a system includes one or more DC loads that are powered by DC power, one or more AC loads that are powered by AC power, and an uninterruptible power supply (UPS). The UPS includes AC terminals connected to an AC power source and to the one or more AC loads to power the AC loads, DC terminals connected to a backup battery and to the one or more DC loads to power the DC loads a bidirectional AC/DC converter connected between the AC terminals and the DC terminals, and a controller that selectively switches the bidirectional AC/DC converter to the first mode when the AC power source is available and to the second mode when the AC power source is not available.

18 Claims, 3 Drawing Sheets

(56) References Cited

U.S. PATENT DOCUMENTS

| | | |
|---|---|---|
| 8,659,187 B2 | 2/2014 | Johnson, Jr. |
| 8,698,354 B2 | 4/2014 | Ghosh et al. |
| 2003/0025397 A1* | 2/2003 | Young .................... H02J 9/062 |
| | | 307/64 |
| 2017/0117709 A1* | 4/2017 | Svedendahl .............. H02J 3/32 |

FOREIGN PATENT DOCUMENTS

| | | |
|---|---|---|
| CN | 203301217 | 11/2013 |
| EP | 3667857 | 6/2020 |
| WO | WO2015127843 | 9/2015 |
| WO | WO 2019/031686 | 2/2019 |

OTHER PUBLICATIONS

Extended European Search Report in European Application No. 20200488.3, dated Jan. 15, 2021, 7 pages.

\* cited by examiner

UPS SYSTEM FOR POWERING ALTERNATING AND DIRECT CURRENT LOADS

BACKGROUND

Uninterruptible power supplies (UPSs) are used in mission critical applications to provide continuous power in case of a power failure event. In general, there are two types of UPS systems, direct current (DC) UPSs and alternating current (AC) UPSs. A DC UPS is used to provide DC power to DC loads. An AC UPS is used to provide AC power to AC loads. Both types of UPSs can provide the backup power from batteries or other stored power sources, such as capacitors.

In a typical AC UPS system, the backup battery is a higher voltage battery than for DC UPS systems. In general, a DC UPS is not compatible with an AC UPS. Thus, different types of UPS systems need to be used in order to supply power to both AC and DC loads.

SUMMARY

This specification describes technologies relating to UPS systems that provide power to both AC and DC loads.

In general, one innovative aspect of the subject matter described in this specification can be embodied in systems that include one or more direct current (DC) loads that are powered by DC power, one or more alternating current (AC) loads that are powered by AC power, and an uninterruptible power supply (UPS) that includes AC terminals connected to an AC power source and to the one or more AC loads to power the AC loads, DC terminals connected to a backup battery and to the one or more DC loads to power the DC loads, a bidirectional AC/DC converter connected between the AC terminals and the DC terminals and that operates in a first mode in which the bidirectional AC/DC converter converts AC power received at the AC terminals to DC power and provides the DC power at the DC terminals, wherein the DC power at the DC terminals charges the backup battery and powers the one or more DC loads; and a second mode in which the bidirectional AC/DC converter converts DC power received at the DC terminals to AC power and provides the AC power at the AC terminals, wherein the AC power at the AC terminals powers the one or more AC loads; and a controller that selectively switches the bidirectional AC/DC converter to the first mode when the AC power source is available and to the second mode when the AC power source is not available. Other embodiments of this aspect include corresponding methods and apparatus.

These and other implementations can each optionally include one or more of the following features. In some aspects, the backup battery provides the DC power at the DC terminals when the bidirectional AC/DC converter is operating in the second mode. The backup battery can also provide DC power to the one or more DC loads when the bidirectional AC/DC converter is operating in the second mode. In some aspects, the AC power source is connected to the one or more AC loads and provides AC power to the one or more AC loads when the bidirectional AC/DC converter is operating in the first mode.

Some aspects include a switch connected between the AC power source and (i) the AC power terminals and (ii) the one or more AC loads. The controller can close the switch when the bidirectional AC/DC converter is operating in the first mode and opens the switch when the bidirectional AC/DC converter is operating in the second mode.

In some aspects, the UPS includes a bidirectional DC/DC converter connected between the AC/DC converter and the DC terminals. In some aspects, when the AC/DC converter is operating in the second mode, the bidirectional DC/DC converter steps up a voltage of the DC power at the DC terminals for input to the bidirectional AC/DC converter and when the AC/DC converter is operating in the first mode, the bidirectional DC/DC converter steps down an output voltage of the bidirectional AC/DC converter.

In general, another aspect of the subject matter described in this specification can be embodied in a UPS that includes AC terminals configured to connect to an AC power source and to one or more AC loads, DC terminals configured to connect to a backup battery and to one or more DC loads, a bidirectional AC/DC converter connected between the AC terminals and the DC terminals and that operates in: a first mode in which the bidirectional AC/DC converter converts AC power received at the AC terminals to DC power and provides the DC power at the DC terminals for charging the backup battery and powering the one or more DC loads; and a second mode in which the bidirectional AC/DC converter converts DC power received at the DC terminals to AC power and provides the AC power at the AC terminals for powering the one or more AC loads; and a controller that selectively switches the bidirectional AC/DC converter to the first mode when the AC power source is available and to the second mode when the AC power source is not available. Other embodiments of this aspect include corresponding methods and apparatus.

In some aspects, the backup battery provides the DC power at the DC terminals when the bidirectional AC/DC converter is operating in the second mode. The backup battery can also provide DC power to the one or more DC loads when the bidirectional AC/DC converter is operating in the second mode.

In some aspects, the AC power source is connected to the one or more AC loads and provides AC power to the one or more AC loads when the bidirectional AC/DC converter is operating in the first mode.

In some aspects, the AC power terminals are configured to connect to a first terminal of a switch that has a second terminal that is connected to the AC power source. The controller can be configured to close the switch when the bidirectional AC/DC converter is operating in the first mode and open the switch when the bidirectional AC/DC converter is operating in the second mode.

In some aspects, the UPS includes a bidirectional DC/DC converter connected between the AC/DC converter and the DC terminals. In some aspects, when the AC/DC converter is operating in the second mode, the bidirectional DC/DC converter steps up a voltage of the DC power at the DC terminals for input to the bidirectional AC/DC converter and when the AC/DC converter is operating in the first mode, the bidirectional DC/DC converter steps down an output voltage of the bidirectional AC/DC converter.

The subject matter described in this specification can be implemented in particular embodiments so as to realize one or more of the following advantages. A single UPS system described in this document can provide power to both AC and DC loads simultaneously in the event of a power failure. Using a single UPS system rather than one for each type of load results in more compact systems, more space for other components, and reduced costs. For example, in a data center environment, a UPS system that can power both types of loads can reduce the amount of rack space required for the UPS system, allowing for more computing components to be installed in each rack. In addition, only one type of power has to be provided to each rack, reducing the complexity of power routing systems that route power to the racks and reducing the number of cables routed to the racks.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document describes technologies relating to UPS systems that can provide power to DC and AC loads in the event of a power failure. Power failures can include loss of input power for the loads, power sags, power surges, under voltage conditions, over voltage conditions, noise on the power line, frequency variation, switching transients, harmonics, or other conditions that cause a UPS to power the loads until the input power returns to normal.

The UPS system can include a bidirectional AC/DC converter that, in one mode, converts AC power to DC power and, in another mode, converts DC power to AC power. In one direction in a first mode, the bidirectional AC/DC converter can act as a rectifier converting AC power to DC power. In a second direction in a second mode, the bidirectional AC/DC converter can act as an inverter converting DC power to AC power. A controller can selectively switch the bidirectional AC/DC converter between the first and second modes depending on whether there is a power failure of the input power for the loads.

An AC power source can be connected to AC terminals of the UPS. The AC terminals can be connected to the AC side of the bidirectional AC/DC converter. The AC power source and the AC terminals can also be connected to one or more AC loads. DC terminals of the UPS system can be connected to one or more backup batteries and to one or more DC loads. The DC terminals can be connected to the DC side of the bidirectional AC/DC converter, e.g., by way of an optional DC/DC converter of the UPS.

In normal operation when the AC power source is available, the AC power source can provide power to the UPS system and the AC loads. The bidirectional AC/DC converter can operate in the first mode in which it converts the AC power received at the AC terminals to DC power provided at the DC terminals. This DC power can charge the backup batteries and power the DC load(s).

When there is a power failure, the bidirectional converter can operate in the second mode. In this mode, the batteries provide DC power to the DC load(s) and to the DC terminals of the UPS. The bidirectional AC/DC converter converts the DC power to AC power provided at the AC terminals. This AC power provided at the AC terminals powers the AC load(s) during the power failure. Thus, the UPS and backup batteries provide power to the AC and DC loads during a power failure.

Figure 1:
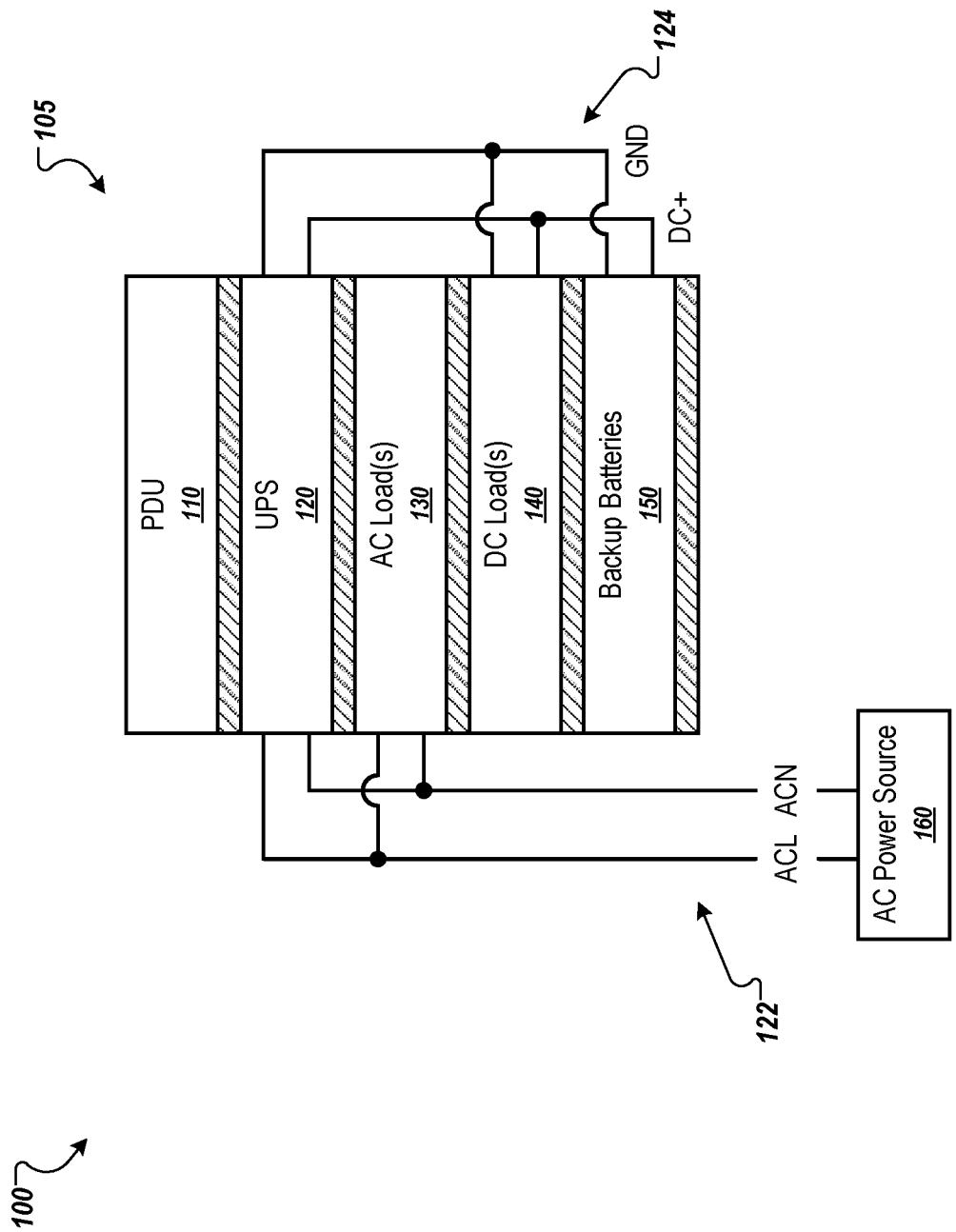
FIG. 1 is a block diagram of an environment in which an example UPS system provides power to DC and AC loads in the event of a power failure.

FIG. 1 is a block diagram of an environment 100 in which an example UPS system provides power to DC and AC loads in the event of a power failure. The environment 100 includes a UPS architecture in which the UPS system powers both DC and AC loads in the event of a power failure. In this example, the UPS system provides continuous power to one or more DC loads 140 and one or more AC loads 120 of a data center rack 105 in the event of a power failure of an input AC power source 160.

The DC load(s) 140 can include loads that are normally powered by DC input power, e.g., 12 VDC loads. The AC load(s) 130 can include loads that are powered by AC input power, e.g., 120 VAC input power. For example, in a data center, the AC loads 130 can include off the shelf equipment that plugs into a standard AC outlet, e.g., a standard 120 VAC outlet, although the equipment actually runs off of DC power. That is, the equipment may include an internal AC/DC converter that converts the AC power to DC power for the equipment. The DC loads in a data center can include equipment that is powered directly by DC power.

The UPS system can include a UPS 120 and one or more backup batteries 150. The UPS 120 is connected to AC power lines 122 that connect the AC power source 160 to the AC load(s) 130 and the UPS 120. The UPS 120 is also connected to DC power lines 124 that also connect to the DC load(s) 140 and the backup batteries 150. Although shown as two different components, the batteries 150 can be part of the UPS 120, e.g., included in the same housing at the rest of the UPS 120.

As described in more detail with reference to FIG. 2, the UPS 120 can include a bidirectional AC/DC converter. The AC side of the bidirectional AC/DC converter can be connected to the AC power lines 122 and the DC side of the bidirectional AC/DC can be connected to the DC power lines 124. The UPS 120 can also include a DC/DC converter on the DC side of the AC/DC converter, as described below.

In normal operation, the bidirectional AC/DC converter can operate in a first mode in which the AC/DC converter converts the AC power on the AC power lines 122 provided by the AC power source 160 to DC power and outputs the DC power onto the DC power lines 124. This DC power can charge the backup batteries 150 and power the DC load(s) 140. A controller of the UPS 120 can put the AC/DC converter into the first mode when the AC power source 160 is available and does not have any faults.

When the AC power source 160 is not available or has a fault, e.g., a power failure, the controller can put the bidirectional AC/DC converter in a second mode in which the bidirectional AC/DC converter converts the DC power on the DC power lines 124 to AC power and outputs the AC power onto the AC power lines 122. In this mode, the backup batteries 150 provides the DC power on the DC power lines 124. The backup batteries 150 also provides power to the DC power load(s) 140 via the DC power lines 124 when the bidirectional AC/DC converter is in the second mode of operation. The AC power output by the UPS 120 onto the AC power lines 122 powers the AC load(s) 130.

In this way, only AC power has to be routed to the rack 105 and the rack 105 does not need both an AC UPS and a DC UPS to power the AC load(s) 130 and the DC load(s) 140. Instead, the UPS 120 and batteries 150 can power both loads when the AC power source 160 is not available or is faulty.

The rack 105 also includes a power distribution unit (PDU) 110. The PDU 110 can distribute power to the AC load(s) 130 and/or DC load(s) 140. For example, the AC or DC output of the UPS 120 can be connected to the PDU 110. That is, rather than connecting the output directly to the loads, the output can be connected to the PDU 110, which is connected to the loads. The PDU 110 can include multiple outlets to which the AC load(s) 130 or DC load(s) can connect. In some implementations, the rack 105 can include a respective PDU 110 for each type of load, e.g., a PDU for the AC load(s) 130 and a PDU for the DC load(s). In this example, the AC output of the UPS 120 can be connected to the input of the AC PDU and the outlets of the AC PDU can be connected to the AC load(s) 130. Similarly, the DC output of the UPS 120 can be connected to the input of DC PDU and the outputs of the DC PDU can be connected to the DC load(s) 140.

Figure 2:
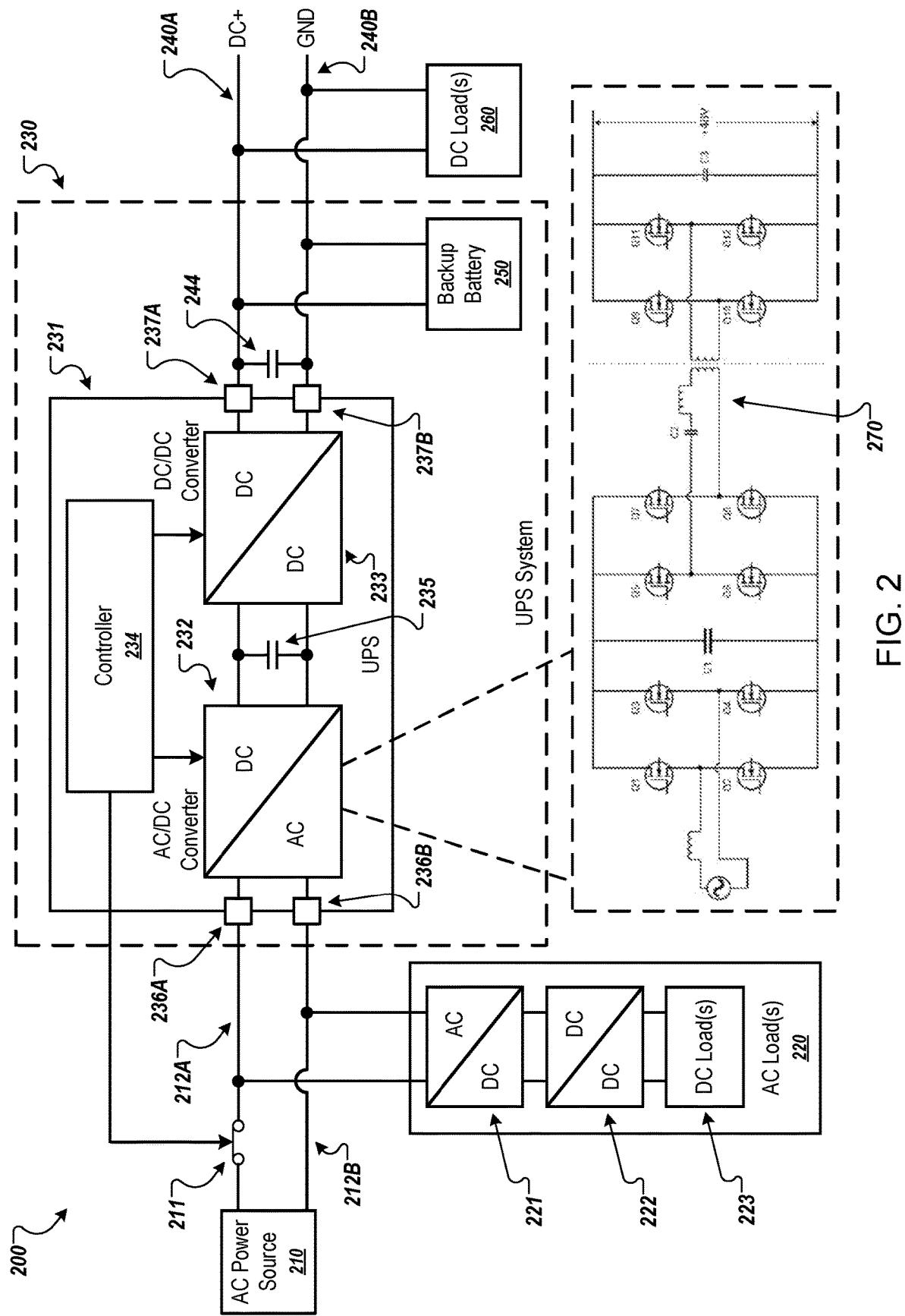
FIG. 2 is a block diagram of another environment in which an example UPS system provides power to DC and AC loads in the event of a power failure.

FIG. 2 is a block diagram of another environment 200 in which an example UPS system 230 provides power to DC and AC loads in the event of a power failure. The UPS system 230 includes a UPS 231 and a backup battery 250. The backup battery 250 can include multiple batteries.

The UPS 231 includes AC terminals 236A and 236B connected to an AC power source 210 by way of AC power lines 212A and 212B (e.g., cables, insulated wires, or other conductors) and a bypass switch 211. The AC power source 210 can be, for example, a 120 VAC or 220 VAC power source. One or more AC load(s) 220 are also connected to the AC power lines 212A and 212B. During normal operation when the AC power source 210, the bypass switch 211 is closed allowing the AC power source 210 to provide input AC power to the UPS 231 and to the AC load(s) 220. As described in more detail below, a controller 234 can operate the bypass switch 211 based on whether the AC power source 210 is available.

In general, an AC load 220 is a load that receives AC power as input. In this example, the AC load 220 includes an AC/DC converter 221 that converts the AC power input to DC power for one or more DC load(s) of the AC load 220. For example, some off the shelf computing equipment is adapted in this way to plug into AC outlets, but to operate DC-powered computing equipment. The AC load 222 also includes a DC/DC converter 222 that can adjust the voltage level of the DC power output by the AC/DC converter 221. For example, the DC/DC converter 222 can step down the voltage for the DC load(s) 223.

The UPS 231 includes a bidirectional AC/DC converter 232 and a bidirectional DC/DC converter 233. The AC side of the AC/DC converter 232 is connected to the AC terminals 236A and 236B. In a first mode, the bidirectional AC/DC converter 232 converts AC power received at the AC terminals 236A and 236B to DC power that is output to the DC/DC converter 233 on the DC side of the AC/DC converter 232. In a second mode, the bidirectional AC/DC converter 232 converts DC power output by the bidirectional DC/DC converter 233 to AC power provided to the AC terminals 236A and 236B. These two modes are described in more detail below.

In some implementations, the bypass switch 211 is part of the UPS 231, e.g., in the same housing of package as the UPS 231. In this example, the UPS 230 can include AC input terminals that are connected to the AC power source 210. The bypass switch 211 can be connected between one of the AC input terminals and the AC/DC converter 232. The UPS 230 can also include AC output terminals. The AC output terminals can be connected to the AC load(s) 230. For example, the AC output terminals can be connected as an input to a PDU and each AC load 230 can be connected to an output of the PDU.

In a first mode, the DC/DC converter 233 can step down the voltage output by the bidirectional AC/DC converter 232 and output the lower voltage DC power at DC terminals 237A and 237B. In a second mode, the bidirectional DC/DC converter 233 can step up voltage received at the DC terminals 237A and 237B for input to the bidirectional AC/DC converter 232. These two modes are described in more detail below.

The DC terminals 237A and 237B are connected to DC power lines 240A and 240B. The DC power lines 240A and 240B are also connected to the backup battery 250 and one or more DC loads 260. The DC load(s) 260 can operate on DC power that has the same voltage level as the backup battery's rated voltage. In this way, the backup battery 250 can power the DC load(s) 260 when the AC power source 210 is not available. For example, the backup battery 250 can be rated for 48 VDC and the DC load(s) 260 can operate on 48 VDC power.

The controller 234 can monitor the AC power source 210 and detect whenever there is a power failure. The controller 234 can operate the bypass switch 211, the bidirectional AC/DC converter 232, and the bidirectional DC/DC converter 233 based on the status of the AC power source 210, e.g., whether the AC power source is available or there is a power failure.

When the AC power source 210 is available, the controller 234 closes the bypass switch 211 and operates both the bidirectional AC/DC converter 232 and the bidirectional DC/DC converter 233 in their respective first modes. With the AC power source 210 available and the bypass switch 211 closed, the AC power source 210 provides AC power to the AC terminals 236A and 236B and the AC load(s) 220. This powers the AC load(s) 220. In addition, the UPS 231 converts the AC power to DC power for charging the backup battery 250 and powering the DC load(s) 260.

In the first mode, the bidirectional AC/DC converter 232 converts the AC power received at the AC power terminals 236A and 236B to DC power for the bidirectional DC/DC converter. That is, the bidirectional AC/DC converter 232 is configured to act as a rectifier in the first mode. In the first mode, the bidirectional DC/DC converter 233 steps down the DC power output by the bidirectional AC/DC converter 232 to a lower voltage for the DC terminals 237A and 237B. This DC power charges the backup battery 250 and powers the DC load(s) 260 by way of the DC power lines 240A and 240B. In a particular implementation, the AC input voltage to the AC power terminals can be between 85-265 Vrms. In this example, the DV output voltage of the AC/DC converter 232 can be about 400 VDC and the DC output voltage of the DC/DC converter 233 (e.g., at the DC terminals 237A and 237B) can be about 54 VDC.

When the controller 234 detects a power failure of the AC power source 210, the controller 234 opens the bypass switch 211 to isolate the UPS system 230, the AC load(s) 220, and the DC load(s) 260 from the AC power source 210. The controller 234 also switches the bidirectional AC/DC converter 232 and the bidirectional DC/DC converter 233 to their respective second modes in response to the power failure.

During a power failure, the backup battery 250 becomes the power source for the UPS 231 and the DC load(s) 260. The backup battery 250 provides DC power to the UPS 231 and the DC load(s) 260 over the power lines 240A and 240B and to the DC terminals 237A and 237B. Thus, the DC terminals 237A and 237B can be DC input terminals and DC output terminals.

In the second mode, the bidirectional DC/DC converter 233 steps up the DC voltage received at the DC terminals 237A and 237B provided by the backup battery 250. In the second mode, the bidirectional AC/DC converter 232 converts the stepped up DC power output by the bidirectional DC/DC converter 233 to AC power and outputs the AC power onto the AC terminals 236A and 236B. That is, the bidirectional AC/DC converter 232 is configured to act as an inverter in the second mode. This AC power output by the bidirectional AC/DC converter powers the AC load(s) 220 during the power failure. Thus, during the power failure, the UPS system 230 provides power to both the AC load(s) 220 and the DC load(s) 260.

Various types of single phase bidirectional AC/DC converters can be used in the UPS 231. In general, the AC/DC converter 232 can include an arrangement of switches and energy storing components (e.g., capacitors and inductors). The switches can be operated differently when converting AC power to DC power than when converting DC power to AC power. The controller 234 can control the switches, e.g., by turning the switches on and off depending on the mode of the AC/DC converter 232.

A circuit diagram of an example bidirectional AC/DC converter 232 is illustrated in FIG. 2. In general, when the bidirectional AC/DC converter 232 is in the first mode as a rectifier, the controller 234 operates switches Q1-Q8 to perform zero voltage switching (ZVS). The controller 234 also operates switches Q9-Q12 to perform zero current switching (ZCS). The controller 234 operates the switches Q1-Q12 to control an LLC 270 that includes two inductors and a capacitor using closed-loop control to regulate the voltage level of the DC output power. For example, the controller 234 can receive voltage measurements of the DC output power, e.g., at the DC terminals 237A and 237B, and adjust the switching frequency of the switches Q1-Q12 to adjust the voltage level.

When the bidirectional AC/DC converter 232 is in the second mode as an inverter, the controller operates the switches Q1-Q8 to perform ZVS and the switches Q9-Q12 to perform ZCS. The controller 234 also operates the LLC 270 as LC and DC transformers, and the LC is operating at resonant frequency. The controller 234 can adjust the modulation index of the totem pole stage to regulate the voltage level of the AC output power. For example, the controller 234 can receive voltage measurements of the AC output and adjust the modulation index of the totem pole stage to bring the voltage level of the AC output to the appropriate voltage level.

In some implementations, the bidirectional DC/DC converter 233 is optional and can be excluded. For example, the bidirectional DC/DC converter 233 can be excluded in implementations in which the bidirectional AC/DC converter 232 converts AC power to DC power having the same voltage level as the rated voltage of the backup battery 250 and the voltage level of the DC. This can reduce the cost of the UPS 230.

The UPS system 230 also includes optional capacitors 235 and 244. The capacitor 235 can be used to condition the DC power between the two converters 232 and 233. Similarly, the capacitor 244 can be used to condition the DC power between the bidirectional DC/DC converter 233 and the backup battery 250 and DC load(s) 260. For example, the capacitors 235 and 244 can be used to smooth the voltage levels at these points.

The UPS system 230 can be implemented as a packaged solution that includes the UPS 231, the bypass switch 211, and optionally the backup battery 250. In this way, the UPS system 230 can be used to provide power to AC and DC loads in various applications, e.g., in electric vehicles, mission critical industrial applications, etc.

Figure 3:
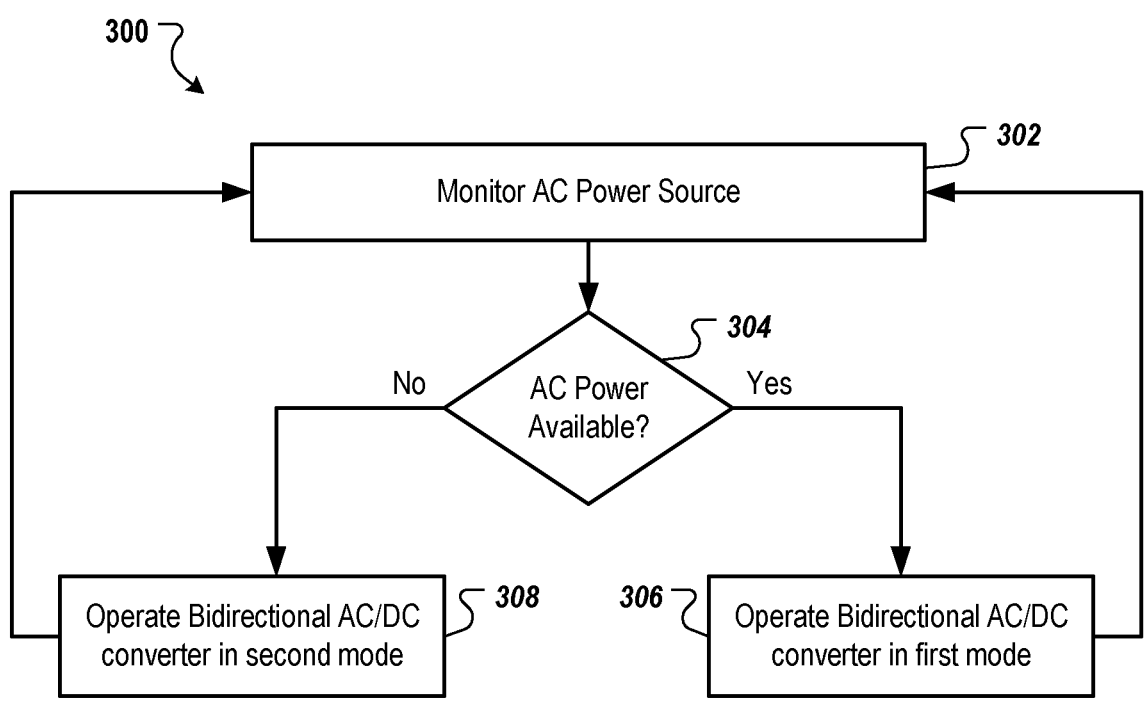
FIG. 3 is a flow diagram that illustrates an example process for providing power to DC and AC loads by a UPS system in the event of a power failure.

FIG. 3 is a flow diagram that illustrates an example process 300 for providing power to DC and AC loads in the event of a power failure. The process 300 can be performed by a UPS, e.g., the UPS 120 of FIG. 1 or the UPS 231 of FIG. 2.

An AC power source is monitored (302). A controller can monitor the AC power source for the availability of input power and/or for a power failure. For example, the controller can monitor the AC power source for a specified set of power failures, such as loss of input power for the loads, power sags, power surges, under voltage conditions, over voltage conditions, noise on the power line, frequency variation, switching transients, and/or harmonics.

A determination is made whether the AC power source is available (304). The power source may be considered available when power from the power source is detected and none of the power failures are detected. The controller can continuously monitor the AC power source and make this determination continuously based on the monitoring.

If the AC power source is available, a bidirectional AC/DC converter of the UPS is operated in a first mode of operation (306). For example, the controller can operate the bidirectional AC/DC converter in the first mode of operation. In the first mode, the AC/DC converter converts AC power from the AC power source to DC power. The output DC power can recharge a backup battery and power one or more DC loads. In addition, the AC power source and the AC side of the AC/DC converter can be connected to one or more AC loads. In the first mode, the AC power source powers the AC load(s).

If the AC power source is not available, the bidirectional AC/DC converter of the UPS is operated in a second mode of operation (308). For example, the controller can operate the bidirectional AC/DC converter in the second mode of operation. In the second mode, the bidirectional AC/DC converter converts DC power from the backup battery to AC power. For example, when the AC power source is no longer available, e.g., a power failure occurs, a bypass switch between the AC power source and the bidirectional AC/DC converter can be opened to isolate the UPS from the AC power sources. The backup battery can then provide DC power to the DC side of the AC/DC converter and to the DC load(s).

The bidirectional AC/DC converter can convert the DC power to AC power. The bidirectional AC/DC converter can output the AC power to the AC load(s) to power the AC load(s). In this way, the UPS provides power to both AC and DC loads when the AC power source is not available.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A system, comprising:
   one or more direct current (DC) loads that are powered by DC power;
   one or more alternating current (AC) loads that are powered by AC power;
   an uninterruptible power supply (UPS) comprising:
      AC terminals connected to an AC power source and to the one or more AC loads to power the AC loads;
      DC terminals connected to a backup battery and to the one or more DC loads to power the DC loads;
      a bidirectional AC/DC converter connected between the AC terminals and the DC terminals and that operates in:
         a first mode in which the bidirectional AC/DC converter converts AC power received at the AC terminals to DC power and provides the DC power at the DC terminals, wherein the DC power at the DC terminals charges the backup battery and powers the one or more DC loads; and
         a second mode in which the bidirectional AC/DC converter converts DC power received at the DC terminals to AC power and provides the AC power at the AC terminals, wherein the AC power at the AC terminals powers the one or more AC loads;
      a bidirectional DC/DC converter connected between the AC/DC converter and the DC terminals;
      one or more power conditioning capacitors connected between the bidirectional AC/DC converter and the bidirectional DC/DC converter; and
      a controller that selectively switches the bidirectional AC/DC converter to the first mode when the AC power source is available and to the second mode when the AC power source is not available.

2. The system of claim 1, wherein the backup battery provides the DC power at the DC terminals when the bidirectional AC/DC converter is operating in the second mode.

3. The system of claim 2, wherein the backup battery also provides DC power to the one or more DC loads when the bidirectional AC/DC converter is operating in the second mode.

4. The system of claim 1, wherein the AC power source is connected to the one or more AC loads and provides AC power to the one or more AC loads when the bidirectional AC/DC converter is operating in the first mode.

5. The system of claim 1, further comprising a switch connected between the AC power source and (i) the AC power terminals and (ii) the one or more AC loads, wherein the controller closes the switch when the bidirectional AC/DC converter is operating in the first mode and opens the switch when the bidirectional AC/DC converter is operating in the second mode.

6. The system of claim 1, wherein:
   when the AC/DC converter is operating in the second mode, the bidirectional DC/DC converter steps up a voltage of the DC power at the DC terminals for input to the bidirectional AC/DC converter; and
   when the AC/DC converter is operating in the first mode, the bidirectional DC/DC converter steps down an output voltage of the bidirectional AC/DC converter.

7. The system of claim 1, further comprising one or more power conditioning capacitors connected between the bidirectional DC/DC converter and the DC terminals, wherein the one or more DC loads comprises at least one non-battery DC load.

8. An uninterruptible power supply (UPS), comprising:
   AC terminals configured to connect to an AC power source and to one or more AC loads;
   DC terminals configured to connect to a backup battery and to one or more DC loads;
   a bidirectional AC/DC converter connected between the AC terminals and the DC terminals and that operates in:
      a first mode in which the bidirectional AC/DC converter converts AC power received at the AC terminals to DC power and provides the DC power at the DC terminals for charging the backup battery and powering the one or more DC loads; and
      a second mode in which the bidirectional AC/DC converter converts DC power received at the DC terminals to AC power and provides the AC power at the AC terminals for powering the one or more AC loads;
   a bidirectional DC/DC converter connected between the AC/DC converter and the DC terminals;
   one or more power conditioning capacitors connected between the bidirectional AC/DC converter and the bidirectional DC/DC converter; and
   a controller that selectively switches the bidirectional AC/DC converter to the first mode when the AC power source is available and to the second mode when the AC power source is not available.

9. The UPS of claim 8, wherein the backup battery provides the DC power at the DC terminals when the bidirectional AC/DC converter is operating in the second mode.

10. The UPS of claim 9, wherein the backup battery also provides DC power to the one or more DC loads when the bidirectional AC/DC converter is operating in the second mode.

11. The UPS of claim 8, wherein the AC power source is connected to the one or more AC loads and provides AC power to the one or more AC loads when the bidirectional AC/DC converter is operating in the first mode.

12. The UPS of claim 8, wherein:
   the AC power terminals are configured to connect to a first terminal of a switch that has a second terminal that is connected to the AC power source;
   wherein the controller is configured to close the switch when the bidirectional AC/DC converter is operating in the first mode and open the switch when the bidirectional AC/DC converter is operating in the second mode.

13. The UPS of claim 8, wherein:
when the AC/DC converter is operating in the second mode, the bidirectional DC/DC converter steps up a voltage of the DC power at the DC terminals for input to the bidirectional AC/DC converter; and
when the AC/DC converter is operating in the first mode, the bidirectional DC/DC converter steps down an output voltage of the bidirectional AC/DC converter.

14. A method performed by one or more data processing apparatus, the method comprising:
monitoring availability of an AC power source;
whenever the AC power source is available, causing a bidirectional AC/DC power converter of an uninterruptible power source (UPS) that comprises AC terminals and DC terminals to operate in a first mode in which the bidirectional AC/DC power converter converts AC power received at the AC terminals to DC power and provide the DC power at the DC terminals to power one or more DC loads connected to the DC terminals and to charge a backup battery connected to the DC terminals; and
whenever the AC power source is not available, causing the bidirectional AC/DC power converter to operate in a second mode in which the bidirectional AC/DC power converter converts DC power received at the DC terminals to AC power and provide the AC power at the AC terminals to power one or more AC loads connected to the AC terminals,
wherein the UPS comprises a bidirectional DC/DC converter connected between the AC/DC converter and the DC terminals, and
wherein the UPS comprises one or more power conditioning capacitors connected between the bidirectional AC/DC converter and the bidirectional DC/DC converter.

15. The method of claim 14, wherein the backup battery provides the DC power at the DC terminals when the bidirectional AC/DC converter is operating in the second mode.

16. The method of claim 15, wherein the backup battery also provides DC power to the one or more DC loads when the bidirectional AC/DC converter is operating in the second mode.

17. The method of claim 14, wherein the AC power source is connected to the one or more AC loads and provides AC power to the one or more AC loads when the bidirectional AC/DC converter is operating in the first mode.

18. The method of claim 14, wherein a switch is connected between the AC power source and (i) the AC power terminals and (ii) the one or more AC loads, the method further comprising closing the switch when the bidirectional AC/DC converter is operating in the first mode and opens the switch when the bidirectional AC/DC converter is operating in the second mode.

* * * * *